United States Patent [19]

Reeder

[11] 4,254,805
[45] Mar. 10, 1981

[54] CLOSED CHEMICAL MIXING SYSTEM

[75] Inventor: Harold E. Reeder, England, Ark.

[73] Assignee: Load Safe Systems, Inc., Heber Springs, Ark.

[21] Appl. No.: 18,450

[22] Filed: Mar. 8, 1979

[51] Int. Cl.³ .......................... B05B 7/26; B65B 31/00
[52] U.S. Cl. ...................................... 141/59; 134/102; 137/205; 141/91; 141/107
[58] Field of Search .................. 134/102, 113; 137/15, 137/205; 141/7, 9, 18, 89–91, 95, 99, 104, 105, 107, 231, 367, 59

[56] References Cited

U.S. PATENT DOCUMENTS

| 3,913,606 | 10/1975 | Anderson | 137/205 |
| 3,916,924 | 11/1975 | McGowan | 134/102 X |
| 3,976,087 | 8/1976 | Bolton et al. | 141/59 X |

Primary Examiner—Frederick R. Schmidt
Attorney, Agent, or Firm—Stephen D. Carver

[57] ABSTRACT

A closed agri-chemical mixing and transferring system ideally adapted for mixing agri-chemical concentrate for subsequent use in agricultural spraying operations. The system comprises a plurality of independently operable subsystems for generating vacuum, intaking raw concentrate, and subsequently loading a sprayer device. The self-contained vacuum subsystem comprises a pump for generating partial vacuum, and means for selectively introducing partial vacuum to preselected ones of a plurality of chemical holding tanks. The mixing subsystem comprises a plurality of couplings adapted to be connected to external probes which may be attached to external chemical concentrate containers. Probe inlet switching valves in fluid flow communication with holding tanks direct partial vacuum to draw chemical concentrate through the probes into the holding tanks. The loading subsystem comprises a transfer manifold adapted to be connected to a source of water and a plurality of dump valves for selectively transferring the concentrated contents of a loaded holding tank to the transfer manifold. Transfer pump means are employed to transfer liquids within the transfer manifold through appropriate valves to an external sprayer machine thereby loading same. A powder box subsystem is preferably included to accommodate dry chemical concentrate.

6 Claims, 9 Drawing Figures

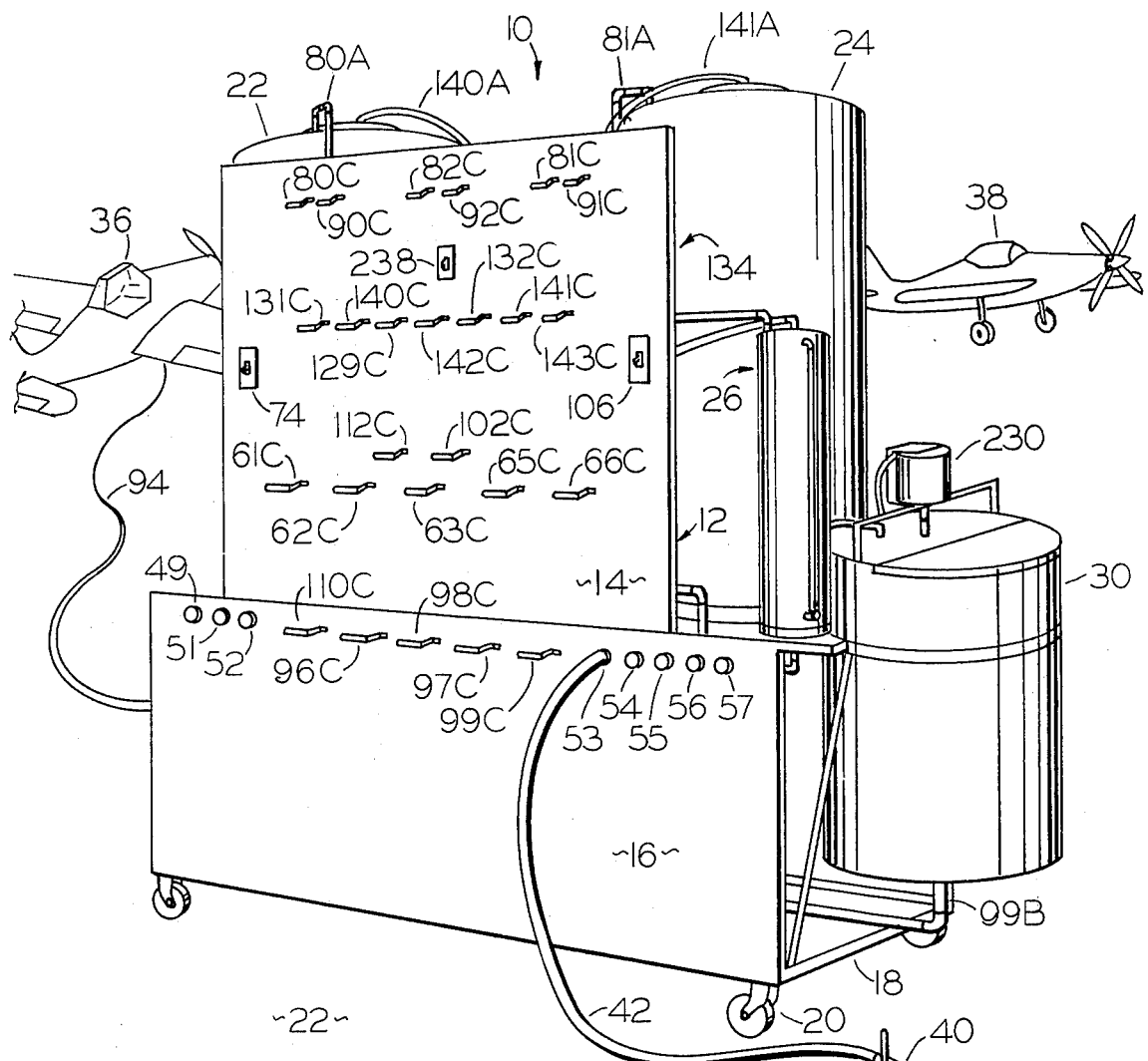
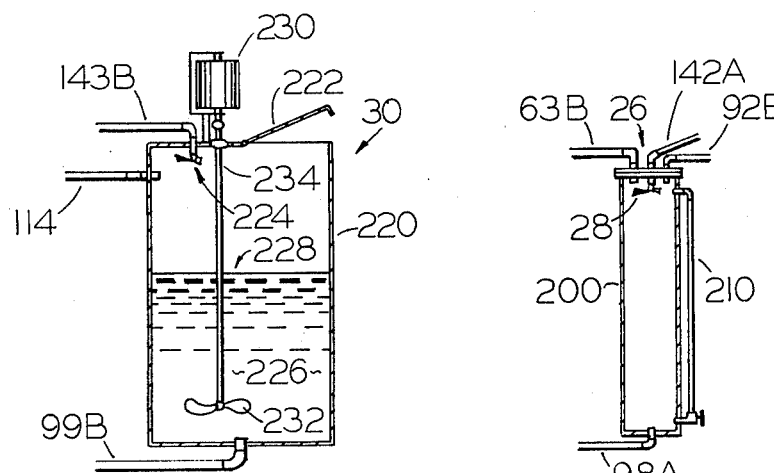
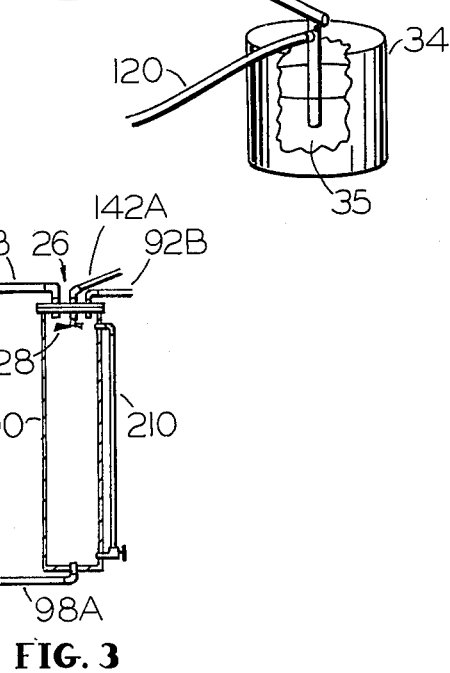
FIG. 1
FIG. 5
FIG. 3

CLOSED CHEMICAL MIXING SYSTEM

BACKGROUND OF THE INVENTION

This invention relates generally to agricultural chemicals. More particularly, the present invention relates to a closed agricultural chemical mixing system whereby highly toxic, concentrated pesticides, herbicides and the like may be properly prepared and loaded for subsequent spraying upon a desired field or crop.

In recent years it has become increasingly apparent that the variety of pesticides, herbicides and the like used in farming operations can be exceedingly harmful to both the environment and the personnel working at a job site. For example, the loading areas associated with aeronautical agricultural spraying operations tend to be repeatedly subjected to the vapors and residue associated with the various agri-chemicals which must be continuously loaded into the airplanes. In the past it has been the practice to simply pour the desired chemical concentrate manually into a tub or container, whereupon water may be haphazardly mixed until the desired chemical solution is achieved. "Systems" of the latter type, although characteristic of the prior art, are now in general disfavor because of the resultant deleterious environmental impact.

Closed agricultural mixing or batching systems employ a partial vacuum delivered to a holding tank of some form, which vacuum is then utilized to draw or suck the toxic contents of a container of herbicide or pesticide, etc. into the holding tank for subsequent mixing or diluting. After mixing in holding tanks the substance may then be forced into awaiting airplanes for spraying in the normal manner. The most representative prior art patent known to applicant in U.S. Pat. No. 3,976,087, issued to J. Bolton for a closed mixing system. Other patents of possible relevance are U.S. Pat. No. 3,797,744 which includes a plurality of chemical holding tanks and U.S. Pat. No. 3,640,319.

In a busy aeronautical agricultural spraying operation empty airplanes may continuously be approaching the service area for refilling. Where the airplanes must wait for the attendant to first mix the various holding tanks with the desired chemical and then unload the chemical, such sequential operation will result in an appreciable waste of time. It has been found most advantageous to provide a closed mixing system which is capable of loading one airplane while simultaneously mixing chemicals in anticipation of the arrival of the next airplane.

Therefore it is an object of this invention to provide a "closed system" agri-chemical mixing and transferring apparatus capable of simultaneously loading an airplane while mixing chemicals to prepare for another airplane.

A related object is to provide a closed mixing system of the character described which is environmentally sound and minimizes pollution.

A similar object of this invention is to provide a closed mixing system which minimizes the risk of exposure of the ground operator to the concentrated chemical preparations with which he must work.

Still another object of this invention is to provide a closed agri-chemical mixing system of the character described which is capable of self-cleaning its various constituent parts through a self-contained rinsing subsystem.

A still further object of this invention is to provide a closed system agri-chemical mixing system which may be completly self-contained and self-operable without the need for an external vacuum generation system.

Yet another object of this invention is to provide a closed agri-chemical mixing system which presents minimal danger to the ground personnel at aero-spraying facilities.

These and other objects and advantages of this invention, along with features of novelty appurtenant thereto, will appear or become apparent in the course of the following description.

BRIEF DESCRIPTION OF THE DRAWINGS

In the following drawings, which form a part of the specification and which are to be construed in conjunction therewith, and in which like reference numerals have been employed throughout to indicate like parts in the various views:

FIG. 1 is a perspective view of a preferred form of the invention, with parts thereof broken away or shown in section for clarity;

FIG. 3 is a sectional view of the small holding tank preferably employed by the instant invention, with parts broken away for clarity;

FIG. 5 is a sectional view of the powder box preferably utilized by the present invention, with parts thereof broken away or shown in section for clarity;

DETAILED DESCRIPTION OF THE INVENTION

Figure 4:
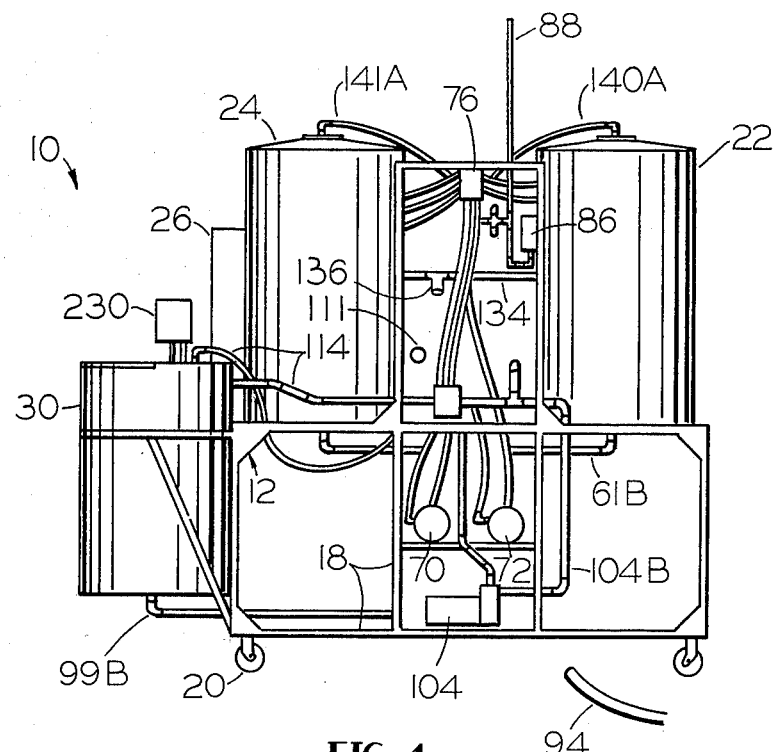
FIG. 4 is a rear plan view of the invention, with parts thereof broken away or shown in section for clarity.

With initial reference to FIGS. 1 and 4, the closed mixing apparatus 10 comprises a generally cubicle chassis 12 defined by a plurality of walls 14, 16 and a rigid frame superstructure 18 of preferably metallic construction. The entire carriage 12 may include a set of optional support wheels 20 so that the apparatus may be conveniently moved by the operator to an accessible position for operation. However, stationary placement of the apparatus 10 is preferred. It is preferred that the supporting surface 22 be of asphalt, concrete or the like so that tipping or tilting of the mechanism can be avoided.

The invention 10 preferably comprises a plurality of chemical concentrate holding tanks including two large tanks 22 and 24 and a smaller tank 26, all rigidly secured to chassis 12. A powder box 30 is also secured to chassis 12, and, as will be described in more detail later, serves process dry chemical concentrate. The function of the apparatus 10 is to draw concentrated agri-chemicals from conventional containers 34 into the holding tanks 22, 24, and 26 for appropriate dilution with water and subsequent delivery into agricultural spray planes 36, 38 or similar agricultural spraying apparatus. The container 34 are tapped by generally L-shaped probes 40 of tubular construction which are then linked to the appropriate fittings illustrated on chassis wall 16 through conventional hoses 42. In operation five probes, each having two lines, may be simultaneously connected to apparatus 10.

A vacuum subsystem 39 (FIG. 8) is actuated to initiate operation of the invention 10. A partial vacuum is first introduced into one of the tanks 22, 24 or 26 for subsequent concentrate filling of same. In order to initiate either the material flow, vacuum or rinse operations of the invention, one or more of the various valves, illustrated in FIGS. 7 thru 9 in diagrammatic form and in FIG. 1 in pictorial form must appropriately be opened. In FIG. 1 each of the valve handles are illustrated in an "off" position. To turn an individual valve "on" the handle portion, visible in FIG. 1, is manually grasped and rotated counter-clockwise approximately 90 degrees.

Referring now to FIGS. 1, 4, 6 and 7, a mixing subsystem 25 is illustrated. The first stage during a mixing or batching operation is for a conventional probe 40 to be coupled to the desired chemical concentrate tank 34 through lid 34A thereof such that the probe tip portion is disposed within the concentrated liquid chemical 35. As illustrated, probe 40 is fitted with a five-gallon extension tube 41A comprising its lower tip. The probe line 42 must be extended from the probe handle 43 (FIG. 6) to chassis 12 for connections to an appropriate probe inlet coupling 51 thru 57. Each inlet coupling comprises conventional "quick connect-disconnect" fittings mechanically secured to chassis surface 16. (Probe rinse line 120 may also be coupled to appropriate fittings, as will be discussed later.)

Probe inlet coupling 51 is coupled to large tank 22 via pipe 61A (FIG. 7), probe valve 61, manifold 61E and pipe 61B. Probe inlet coupling 52 is similarly connected to large tank 22 via lines 62A, probe inlet valve 62 and manifold 61E. Probe valve 61 and 62 are manually operated via adjustment of handles 61C and 62C respectively, which are offset from panel 14 (FIG. 1). Probe inlet coupling 55 (FIG. 1) leads to large tank 24 via probe valve 65 (FIG. 7), manifold 65E and line 65B. Probe inlet coupling 56 also leads to large tank 24, through line 66A, probe valve 66, manifold 65E and pipe 66B. The handle portions 65C and 66C of valves 65 and 66 respectively project outwardly from surface 14 (FIG. 1). The small tank probe inlet 53 communicates with small tank 26 via pipes 63A, 63B and small probe valve 63. Valve 63 is controlled by handle 63C from the front of the apparatus.

Before the concentrated contents 35 of container 34 will be drawn into the desired holding tank, a partial vacuum must be introduced in the tank to be filled by operating vacuum subsystem 39. Vacuum is generated by a pair of conventional vacuum pumps 70 and 72 (FIGS. 8, 4) which are electrically driven and controlled by a conventional electrical switch 74 mounted on chassis panel 14. Pumps 70 and 72 are secured within chassis 12 to the cubicle frame portion 18 thereof (FIG. 4). Partial vacuum is transferred through a first vacuum manifold 75 and a moisture filter 76 to a second vacuum manifold 78 which communicates with three vacuum intake valves 80, 81 and 82 which are respectively coupled to tanks 22, 24 and 26 (FIG. 8). When the vacuum pumps are actuated their waste output may be vented to the atmosphere via an exhaust pipe 84 which leads to an enviornmentally protective exhaust filter 86 and from thence to an atmospheric vent pipe 88. Vacuum intake valves 80 and 82 are controlled through handles 80C, 81C, and 82C mechanically located in the top portion of chassis surface 14 (FIG. 1). As will be discussed later in conjunction with FIG. 2, tanks 22 and 24 are provided with internal float valves 83 and 85 to prevent the intake of liquid into vacuum lines when the holding tanks are full of concentrate. With the vacuum pumps 70, 72 appropriately energized by actuation of conventional switch 74, a partial vacuum may be introduced in the desired tank 22, 24, or 26 by opening one of valves 80, 81 or 82 respectively.

With a partial vacuum applied to the appropriate holding tank or tanks, it will be apparent that subsequent opening of probe inlet valves 61, 62, 65, 66 or 63 will draw chemical concentrate into the desired tank from the container 34, providing that an appropriate hose (hose 42) has been appropriately terminated in the correct probe inlet coupling 51 thru 57. For example, if small tank 26 is to be filled with chemical concentrate 35, hose 42 must be connected to coupling 53 (as illustrated in FIG. 1) so that when valve 63 is opened (by manipulation of valve handle 63C), concentrate will be drawn directly into small tank 26. As will be described in more detail later in conjunction with FIGS. 2 and 3, each of the holding container tanks preferably includes a site level or gauge which visibly indicates tank level.

After an appropriate amount of chemical concentrate is drawn into the desired holding tank 22, 24 or 26, the previously discussed probe inlet valves are closed and the vacuum pump switch 74 is turned to an "off" position. Prior to loading the aircraft (or other external sprayer device) with the contents of the holding tank 22, 24 or 26, the remaining partial vacuum must first be dissipated. Accordingly, vacuum vent valves 90, 91, and 92 are respectively coupled between tanks 22, 24, and 26 to exhaust vent manifold 87 via pipes 90A, 91A and 92A (FIG. 8). Venting to the atmosphere thus occurs via filter 86 and vent pipe 88. Vent valves 90 thru 92 may be manually manipulated by grasping handle portions 90C, 91C, or 92C respectively (FIG. 1).

Next, a loading hose 94 is connected between the spray tanks of the aircraft 36 or 38 and the aircraft load coupling 95 (FIG. 7) at the rear of the apparatus. An appropriate material dump valve 96 thru 99 must then be actuated to allow the contents of tanks 22, 24, 26 (or powder box 30) to enter dump manifold 100. Dump valves 96 thru 99 are actuated via manipulation of corresponding handle portions 96C thru 99C associated with front panel 16 (FIG. 1). Aircraft fill valve 102 is actuated via handle 102C to interconnect hose 94 with transfer manifold 103 via pipe 95B. Transfer pump 104, interconnected between transfer manifold 103 and dump manifold 100, is actuated by switch 106 (FIG. 1) and electrically powered in a conventional fashion. When the transfer pump is actuated the aircraft may thus be filled with an appropriate amount of chemical concentrate. Once chemical concentrate is delivered to the aircraft, transfer pump 104 may be turned off and the dump valve in use (96 thru 99) will be closed. Thereafter fresh water valve 110, which delivers water supplied from an external source through pipe 111 into manifold 100, may be opened by manipulation of handle 110C. Fresh water may then be pumped via pump 104 through load valve 102, conduit 95B, and loading hose 94 into the aircraft tank to dilute the concentrate already delivered thereto. Mixing amounts and ratios may be controlled with the use of the aircraft tank gauges, for example.

Figure 7:
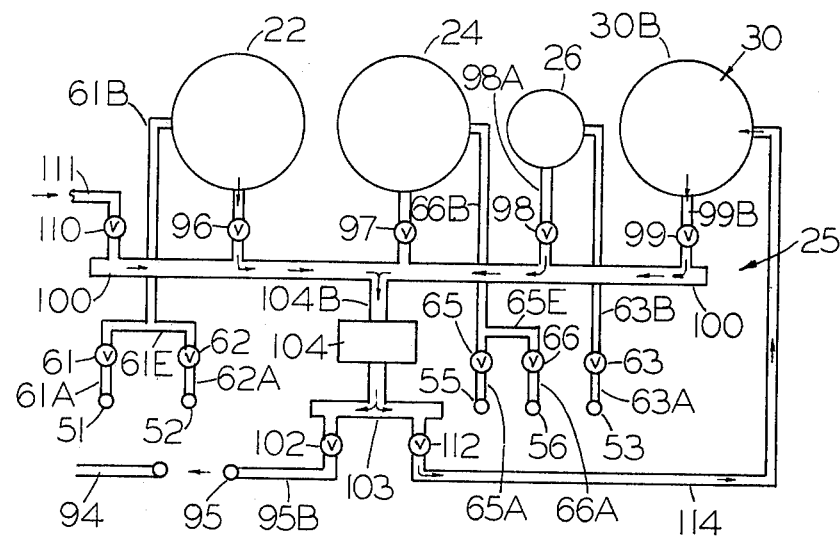
FIG. 7 is a diagrammatic view of the mixing subsystem showing the material flow path utilized by the present invention.

A powder box subassembly 30 (FIG. 5) is preferably included for mixing dry chemical concentrate. A valve 112 (FIG. 7) actuated through handle 112C (FIG. 1) is interconnected between transfer manifold 103 and a powder box 30 through a conduit 114. It will be apparent that water may therefore be forced into the powder box through the transfer pump when valves 110, 112 are opened. When a sufficient level of water has been introduced into powder box 30, valve 110 may be closed and powder box dump valve 99 may be opened so that water and chemical powder will be continuously recirculated (through valve 112, conduit 114, powder box 30, dump valve 99, manifold 100, pump 104 and transfer manifold 103). In this manner dry chemical concentrate may be thoroughly mixed with water prior to subsequent delivery to aircraft 36 in the manner already discussed (through valve 102, line 94, etc.).

Figure 6:
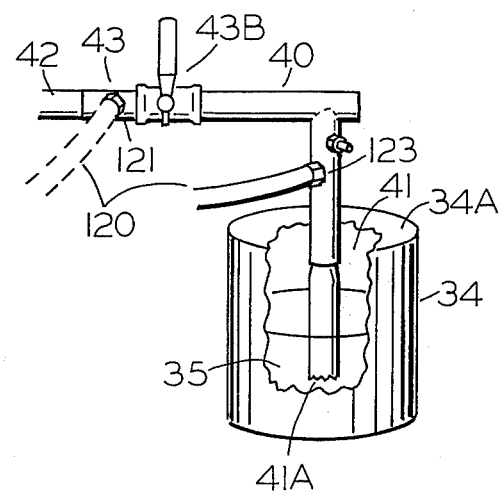
FIG. 6 is a sectional view with parts thereof broken away for clarity showing a conventional probe adapted to be utilized with the present invention secured to a conventional agri-chemical concentrate container.
Figure 9:
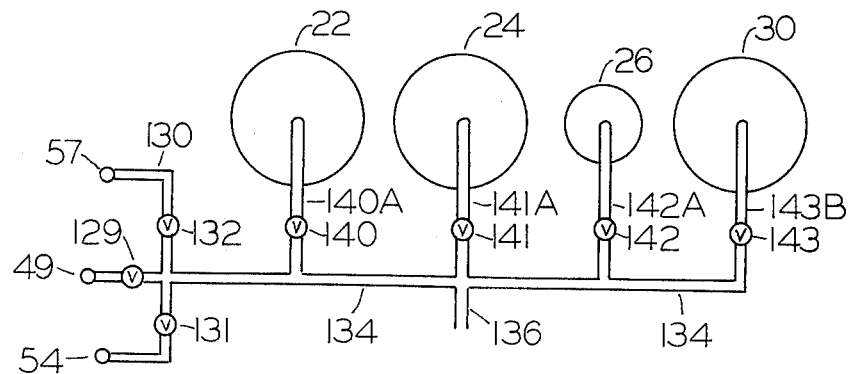
FIG. 9 is a diagrammatic view showing the preferred rinse operation flow path employed by the invention.

Apparatus 10 is provided with a rinsing subsystem so that after a loading operation involving a particular tank has been completed, rinsing of either the external concentrate container, the appropriate holding tank, the probe, the powder box, or internal system pipes may take place. Probe rinse line 120 (FIG. 6) is connected between probe quick connector 123 and one of the probe rinse couplings 49, 54 or 57 (FIGS. 1, 9). Probe rinse coupling 57 leads through a conduit 130 and through a probe rinse valve 132 into a fresh water rinse manifold 134, which receives water from an external low volume source through a line 136. Probe rinse valve 132 is actuated via handle 132C (FIG. 1). Similarly, probe rinse couplings 49 and 54 are coupled to manifold 134 via probe rinse valves 129 and 131 respectively, which valves are respectively operated via handles 129C and 131C (FIG. 1). Thus each probe inlet coupling may be operably associated with a corresponding probe rinse coupling. After rinse water has accumulated within the concentrate container it may be drawn into the appropriate holding tank and then loaded into the airplane (or other sprayer device) through the procedures already discussed. Where the concentrate container is not empty, the probe and its intake line 42 may be rinsed by coupling rinse line 120 instead to fitting 121 (with valve 43B closed) and thereafter following the above set forth procedure.

Figure 2:
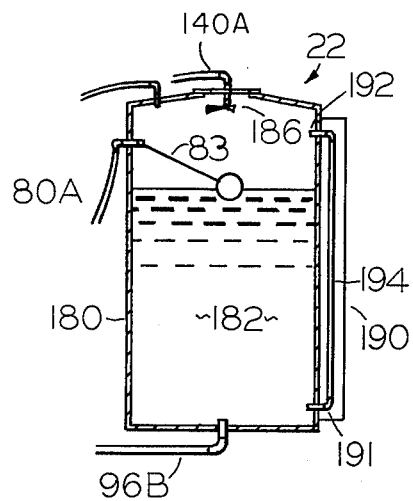
FIG. 2 is a sectional view of one of the large holding tanks shown in FIG. 1, with parts thereof broken away or shown in section for clarity.

With reference now to FIG. 2, large container tank 22 (similar to container tank 24) comprises a preferably metallic cylindrical casing 180 adapted to securely contain the chemical concentrate 182 drawn there within. At the bottom of the container a material dump pipe 96B is provided, terminating in dump valve 96 (FIG. 7) already discussed. At the top of container 180 rinse pipe 140A delivers pressurized water (during the rinsing cycle discussed in conjunction with FIG. 9) to a propeller mechanism 186 which sprays water interiorly of the container to thoroughly rinse the sides and substantially the entire internal surface area thereof. At the side of container 180 a conventional sight gauge 190 is provided for visually monitoring tank levels. Gauge 190 comprises a pair of pipe fittings 191 and 192 between which a substantially translucent tube 194 is suspended. The level of fluid within tube 194 is visible to the operator of the apparatus 10, so that the amount of fluid to be transferred to the awaiting airplane can be readily determined. A conventional float valve assembly 83 is provided to prevent the inadvertent introduction of chemical concentrate into vacuum line 80A. It should be understood that large tank 24 is identical with tank 22.

Figure 8:
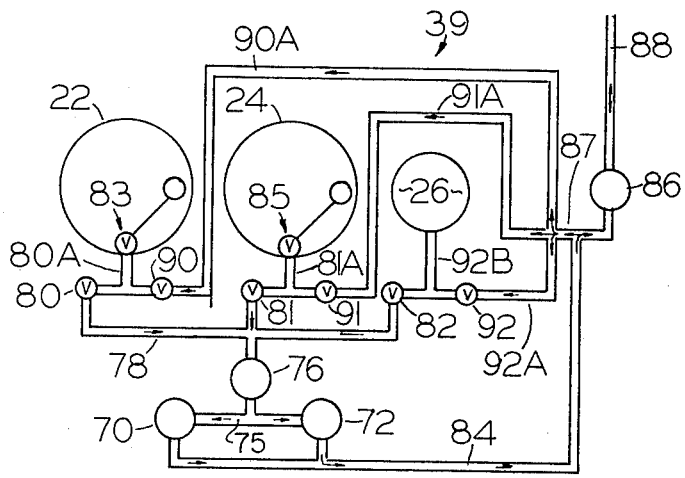
FIG. 8 is a diagrammatic view showing the preferred vacuum flow path employed by the invention.

Referring now to FIG. 3, small tank 26 comprises an elongated, cylindrical container 200 of preferably metallic construction, and is somewhat smaller in diameter than the large tanks 22 or 24. A lower material dump pipe 98A extends to material dump valve 98. At the top of the container a vacuum pipe 92B (also illustrated in FIG. 8) is provided, and a propeller rinse apparatus 206 driven by pressurized water provided through pipe 142A is included to thoroughly rinse the interior of the container. Pipe 63B provides material input responsive to the partial vacuum already discussed. Again, a slight tube 210 is provided of conventional construction for monitoring tank level.

As illustrated in FIG. 5, the powder box 30 comprises a cylindrical, preferably metallic enclosure 220 which includes a hinge top portion 222 which may be opened manually in order to deposit powdered chemical concentrate within the apparatus. Material dump pipe 99B is secured through conventional pipe fitting techniques to the bottom of the casing 220. Rinsing pipe fitting 143B drives a propeller system for spraying the entire internal surface area of the container 224 during the rinsing cycle. Pipe fitting 114 injects water at the top of the container 220. Importantly, severe agitation of the contents 226 within container 220 may be provided by the propeller agitation system 228 located within the device. Agitation system 228 includes a top-mounted motor 230 which drives a lower internally located propeller 232 through a rotating shaft 234. When the powder box agitation switch 238 (FIG. 1) is activated, motor 230 will thereby mix the contents of the powder box apparatus.

It will be apparent from the foregoing that, due primarily to the multi-valve and multi-manifold fluid transfer arrangements already discussed, the various tanks 22, 24, 26, and 30 may be employed substantially independently of each other.

From the foregoing, it will be seen that this invention is one well adapted to obtain all the ends and objects herein set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A closed agri-chemical mixing and transferring system comprising:
    a generally upright chassis adapted to be disposed upon a supporting surface;
    means disposed within said chassis for generating partial vacuum;
    vacuum manifold means for distributing partial vacuum, said manifold means in fluid flow communication with said vacuum generating means;
    a plurality of chemical holding tanks for storing and outputting concentrated agri-chemicals;
    a plurality of vacuum switching valves in fluid flow communication with said vacuum manifold means for selectively imparting partial vacuum to as desired holding tank to be loaded with chemical concentrate independently of the operation of others of said holding tanks;

a plurality of probe inlet couplings accessible from said chassis and adapted to be connected to external probes for receiving chemical concentrate;

a plurality of probe inlet switching valves in fluid flow communication between said holding tanks for selectively establishing fluid flow communication between said holding tanks and said probes independently of the operation of others of said holding tanks whereby partial vacuum within said holding tanks draws chemical concentrate thereinto;

vacuum vent means for venting preselected ones of said holding tanks after loading said tanks with chemical concentrate;

transfer manifold means adapted to be connected to a source of water for selectively receiving the contents of said holding tanks;

a plurality of dump valves for selectively transferring the contents of a desired holding tank into said transfer manifold means independently of the operation of others of said holding tanks;

transfer pump means for transferring liquids reaching said transfer manifold means to an external sprayer apparatus to be loaded;

means for selectively rinsing preselected ones of said holding tanks independently of the operation of others of said holding tanks, said rinsing means comprising:
  fresh water manifold means adapted to be connected to an external, pressurized source of water;
  a plurality of rinse valves for individually transferring water from said fresh water manifold means to a preselected holding tank to be rinsed; and,
  rotatable sprayer means disposed internally of each holding tank for forcefully rinsing substantially the entire surface area within said holding tank in response to water pressure; and, powder box means for mixing dry chemical concentrate and dispensing liquid solution, said powder box means comprising:
  container means into which dry chemical concentrate may be poured for subsequent mixing;
  powder box dump valve means for connecting said powder in fluid flow communication with said transfer manifold; and
  powder box agitation valve means connected between the output of said transfer pump and said powder box whereby the contents of said powder box may be continuously recirculated between said powder box and said transfer manifold, thereby mixing said dry chemical concentrate.

2. The combination as defined in claim 1 including means for rinsing said external probes comprising:
  fresh water manifold means adapted to be connected to a source of fresh water; and
  probe rinse valve means in fluid flow communication with said last mentioned manifold means for transferring water to said external probe(s) for rinsing same.

3. The combination as defined in claim 1 wherein said powder box comprises:
  propellor means disposed within said container means for thoroughly mixing chemical concentrate and water;
  motor means for actuating said propellor means; and
  switching means accessible from said chassis for selectively manually energizing said motor means.

4. A closed system for mixing and outputting agrichemical preparations to an external sprayer device, said system comprising:
  a plurality of chemical holding tanks;
  a vacuum subsystem for selectively applying a partial vacuum to independently selected ones of said holding tanks, said vacuum subsystem comprising:
    vacuum pump means for generating a partial vacuum;
    vacuum manifold means in fluid flow communication with said vacuum pump for distributing partial vacuum; and
    a plurality of vacuum valves for selectively interconnecting said vacuum manifold means with preselected ones of said chemical holding tanks independently of the operation of others of said chemical holding tanks;
  a mixing subsystem for selectively intaking chemical concentrate into preselected ones of said holding tanks independently of the operation of others of said holding tanks, said mixing subsystem comprising:
    a plurality of probe inlet couplings adapted to be coupled to external probes for receiving chemical concentrate; and
    a plurality of inlet switching valves in fluid flow communication with said holding tanks for selectively establishing fluid flow communication between said holding tanks and said probes whereby partial vacuum draws chemical concentrate into said holding tank; and
  a loading subsystem for transferring the contents of a preselected loaded holding tank to said applicator device independently of the operation of others of said holding tanks, said loading subsystem comprising:
    vacuum vent means for venting holding tanks to be unloaded;
    transfer manifold means adapted to be connected to a source of water for selectively receiving the contents of said loaded holding tank;
    a plurality of dump valves for selectively transferring the contents of a loaded holding tank to said transfer manifold; and
    transfer pump means for transferring liquids reaching said transfer manifold means to said external sprayer applicator device;
  a subsystem for selectively rinsing preselected ones of said holding tanks independently of the operation of others of said holding tanks, said rinsing subsystem comprising:
    fresh water manifold means adapted to be connected to an external, pressurized source of water;
    a plurality of rinse valves for individually transferring water from said fresh water manifold means to a preselected holding tank to be rinsed; and
    rotatable sprayer means disposed internally of each holding tank for forcefully rinsing substantially the entire surface area within said holding tank in response to water pressure; and a powder box subsystem for mixing dry chemical concentrate and dispensing liquid solution, said powder box subsystem comprising:

container means into which dry chemical concentrate may be poured for subsequent mixing;

powder box dump valve means for connecting said powder box in fluid flow communication with said transfer manifold; and powder box agitation valve means connected between the output of said transfer pump and said powder box whereby the contents of said powder box may be continuously recirculated between said powder box and said transfer manifold, thereby mixing said chemical concentrate.

5. The combination as defined in claim 4 including means for rinsing said external probes comprising:

fresh water manifold means adapted to be connected to a source of fresh water; and probe rinse valve means in fluid flow communication with said last mentioned manifold means for transferring water to said external probe(s) for rinsing same.

6. The combination as defined in claim 4 wherein said powder box comprises:

propellor means disposed within said container means for thoroughly mixing chemical concentrate and water;

motor means for actuating said propellor means; and switching means accessible from said chassis for selectively manually energizing said motor means.

* * * * *